United States Patent [19]

Brower

[11] Patent Number: 4,843,416
[45] Date of Patent: Jun. 27, 1989

[54] AUTOFOCUS CAMERA SYSTEM

[75] Inventor: Michael J. Brower, Lombard, Ill.

[73] Assignee: W. Haking Enterprises Limited, Hong Kong, Hong Kong

[21] Appl. No.: 163,375

[22] Filed: Mar. 2, 1988

[51] Int. Cl.$^4$ .............................................. G03B 3/00
[52] U.S. Cl. .................................... 354/403; 354/484
[58] Field of Search ............................... 354/403, 484

[56] References Cited

U.S. PATENT DOCUMENTS

| | | | |
|---|---|---|---|
| 3,639,048 | 2/1972 | Heaney | 353/101 |
| 4,394,077 | 7/1983 | Yoshino et al. | 354/403 |
| 4,415,245 | 11/1983 | Harvey | 354/403 |
| 4,459,003 | 7/1984 | Kagechika . | |
| 4,473,285 | 9/1984 | Winter | 354/403 |
| 4,479,706 | 10/1984 | Takahashi | 353/403 |
| 4,518,253 | 5/1985 | Takahashi | 354/403 |
| 4,533,227 | 8/1985 | Takahashi | 354/403 |

*Primary Examiner*—Russell E. Adams
*Attorney, Agent, or Firm*—Wallenstein, Wagner & Hattis, Ltd.

[57] ABSTRACT

An infrared ranging system for a battery-powered camera uses a light-emitting diode and associated pulse circuitry for producing a single ranging flash concentrated by a lens into a narrow cone of light generally centrally located in the field of view. The diode is powered by a capacitor bank charged in parallel and discharged in series to provide the necessary current pulse to the diode from a 2.0 volt system. The received pulse is concentrated on a photosensing diode by means of an infrared-passing lens to produce a voltage pulse related to amplitude of the reflected light, and hence to the range to a centrally located object in the field, this pulse being processed to set the state of one or more range-indicating latch circuits. The state of the latch circuits is used to govern the final setting of a driven adjustable focus lens. The system is equally applicable to setting the camera aperture in flash mode wherein the aperture is a range-dependent function.

14 Claims, 3 Drawing Sheets

AUTOFOCUS CAMERA SYSTEM

TECHNICAL FIELD

The technical field of the invention is automatic electrically operated cameras, and in particular range sensing systems for battery-powered cameras.

BACKGROUND ART

In battery-powered cameras there have long been known a variety of range sensing systems for automatically setting the focus of the lens to correspond to the distance of an object centrally located in the field of view, or alternatively for adjusting the aperture in flash mode where the aperture setting is also a range-dependent parameter. Such systems have employed ultrasonic or infra-red signals directed at the object of interest. The infra-red signal sources were generally gas filled flash lamps. In some cases, the same flash lamp used for illuminating the subject is also used in a pre-flash mode to first generate the range determining signal. In other cameras, a separate gas flash lamp is used for range determining purposes. In either case, the distance of the object from the camera is determined by measuring the amplitude of the reflected signal. The use of gas filled flash lamps as the source of infra-red energy is relatively costly as compared, for example, to the cost of using infra-red light emitting diodes; however, the intensity of the energy directed by such diode sources has heretofore been of such low intensity that it is believed that only a triangulation means using relatively expensive circuitry for determining range was thought to be practical.

An example of a ranging system which uses a triangulation based measuring system is currently marketed by Hamamatsu Photonics of Hamamatsu City, Japan, and is described in their technical data sheet entitled "Autofocus Devices" dated March, 1984. The system described therein is based upon an optical triangulation system wherein a light-emitting diode is powered at relatively low power and focused into a beam directed at an object centrally located in the scene to be photographed. A position sensing diode is disposed to receive reflected light focused thereon by a lens, the position of the spot on the diode being used to derive a difference signal used to govern signal processing circuitry so that the output signal used to govern the relevant camera parameter is related to the range of the object.

The photosensing diode is a three-terminal device in the form of a P-I-N diode having a common electrode on the rear face thereof and a pair of output electrodes disposed on the light-receiving face on either side of a central sensing region. The position sensing diode is operated in biased photovoltaic mode, and appears to provide a voltage difference at the two output terminals according to the position of the incident light spot with respect to the center of symmetry of the structure. The signal processing circuitry associated with such a device appears to be quite complex, involving a pair of signal processing circuits. Each signal processing circuit in turn feeds a distance calculation circuit, the output of which is fed to a sample-and-hold or alternatively to an analog-to-digital converter to govern the adjustment of the relevant camera parameter. The circuitry necessary to accomplish this is quite expensive, and the photosensing diode itself, being a three-terminal device, is expensive because of the number of terminals alone, as well as because of the highly specialized nature of the device itself. Additionally, the light emitting diode appears to be driven at a relatively low power level of 10 milliwatts, which would raise a severe signal-to-noise problem. This in all likelihood requires a continuous modulation of the diode driver power, coupled with some form of synchronous detection in the signal processing circuitry; however, no such feature is shown explicitly in the aforementioned Data Sheet.

There remains a need in the case of cameras for the intermediate price market for an inexpensive infra-red range sensing system which does not have the complexity, and hence the expense, of the systems of the type described hereinabove. Moreover, as applied to cameras having two-position lenses wherein the lens is set to either a far-focus position placing the distant edge of the field at infinity (the hyperfocal distance) or to a near-focus setting substantially closer than the hyperfocal setting, a simple range finding system capable of providing reliable ranging information for objects out to no more than 15 feet or so would be more than adequate, provided that it can be accomplished at minimum cost.

To the applicant's knowledge, no such system has yet been provided.

SUMMARY OF THE INVENTION

According to a feature of the invention, a camera range-finding system employs an infra-red light-emitting diode operated in pulse mode to produce a single relatively high amplitude pulse of infra-red light confined by directing means, preferably in the form of a lens, to define a relatively narrow cone of illumination projected into a generally centrally located region of the field of view. An infra-red sensing diode receives the reflected light from a second directing means, again preferably in the form of a lens, which focuses light reflected from an object in this centrally located region onto a detecting diode to produce an excitation signal having an amplitude which increases generally according to the amount of light received by the second directing means. In the preferred form of the invention, the amplitude of this signal is used to set one or more latching comparators which govern the terminal position of a lens drive system, or alternatively an aperture drive system, to adjust these image-affecting parameters according to the strength of the received radiation, and hence according to the distance to the object.

According to specific features of the invention, the light emitting diode is driven in a short pulsed mode wherein a short current pulse is applied to excite the diode, the pulse current being substantially greater than the maximum steady-state rated current of the diode, and in the preferred embodiment, being at least an order of magnitude greater. According to a further specific feature of the invention, the light-emitting diode is provided with its excitation current from a bank of two or more capacitors which are charged in parallel from a regulated battery voltage of 2.0 volts and discharged in series, thereby boosting the excitation voltage and allowing diodes of the gallium arsenide family having relatively high excitation voltages to be successfully employed even if the source 3.0 volt battery becomes weak.

The resulting ranging system is reliable up to ranges of at least 15 feet, and thus provides the desired inexpensive control of the camera. Other features and advantages of the invention will become apparent upon mak-

DETAILED DESCRIPTION

Figure 1:
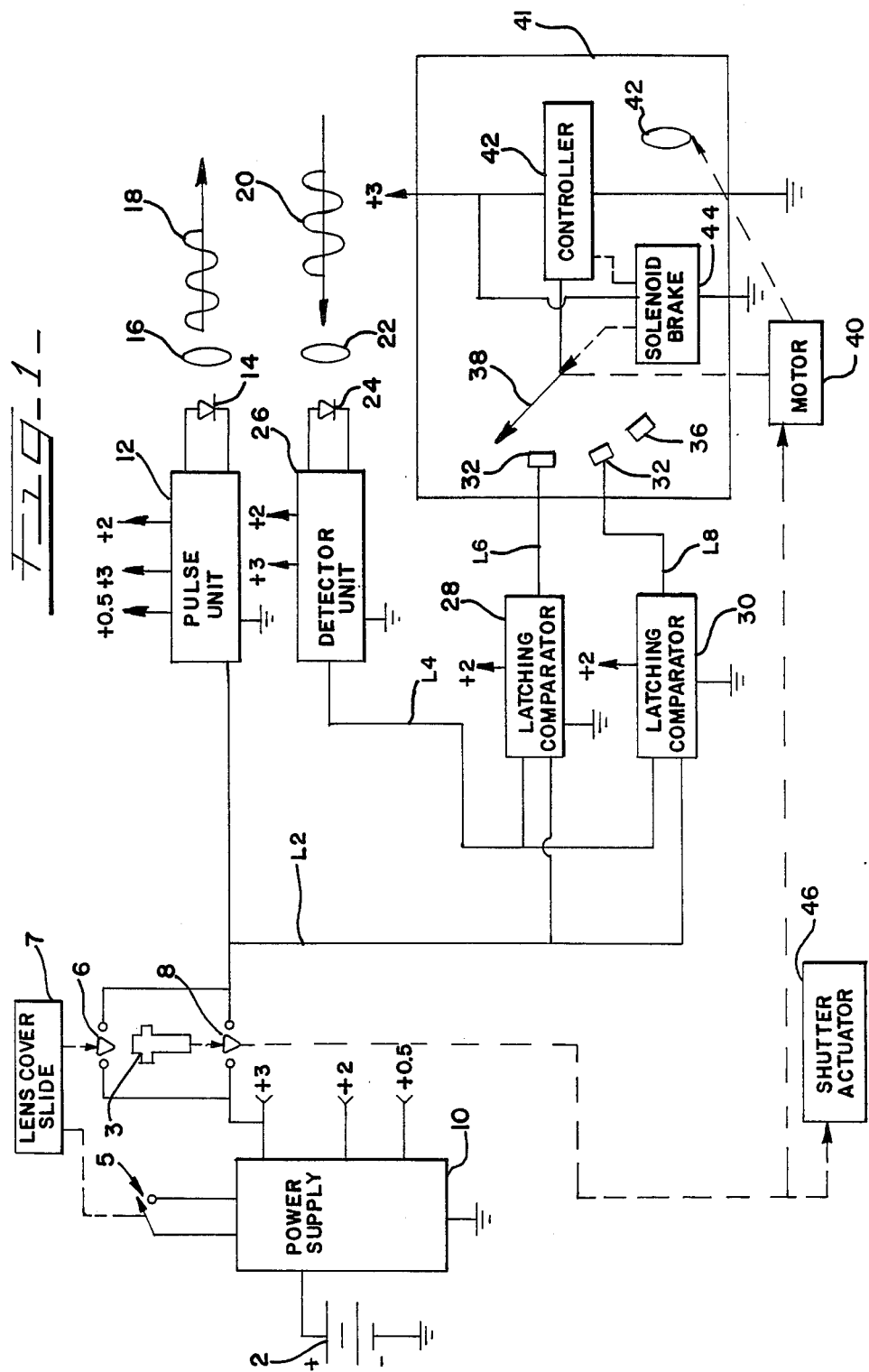
FIG. 1 is a block schematic diagram of the principal elements of an electrically operated camera deriving range information from an emitted and reflected light pulse using the amplitude of the reflected pulse to adjust either lens focus or lens aperture.

While this invention is susceptible of embodiment in many different forms, there is shown in the drawings and will herein be described in detail a preferred embodiment of the invention with the understanding that the present disclosure is to be considered as an exemplification of the principles of the invention, and is not intended to limit the broad aspect of the invention to the embodiment illustrated.

Figure 2:
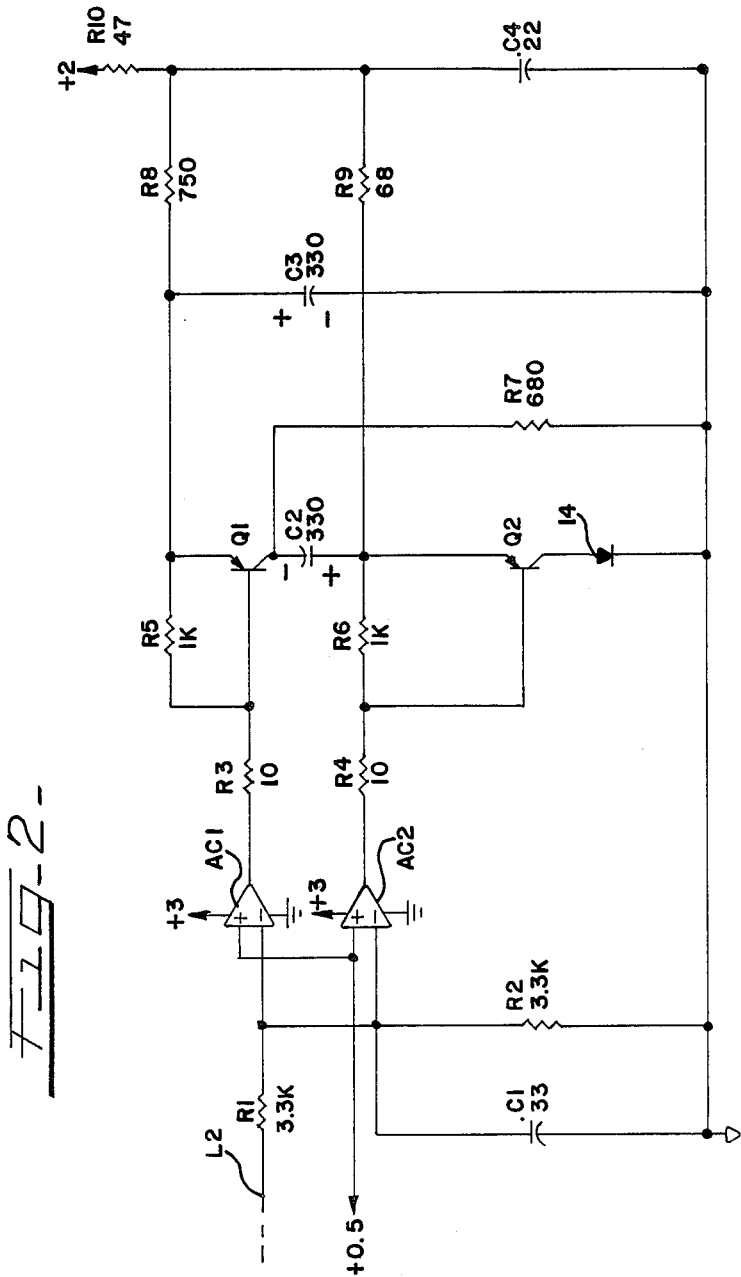
FIG. 2 is a schematic diagram of a circuit for producing electrical pulses to energize a light emitting diode.
Figure 3:
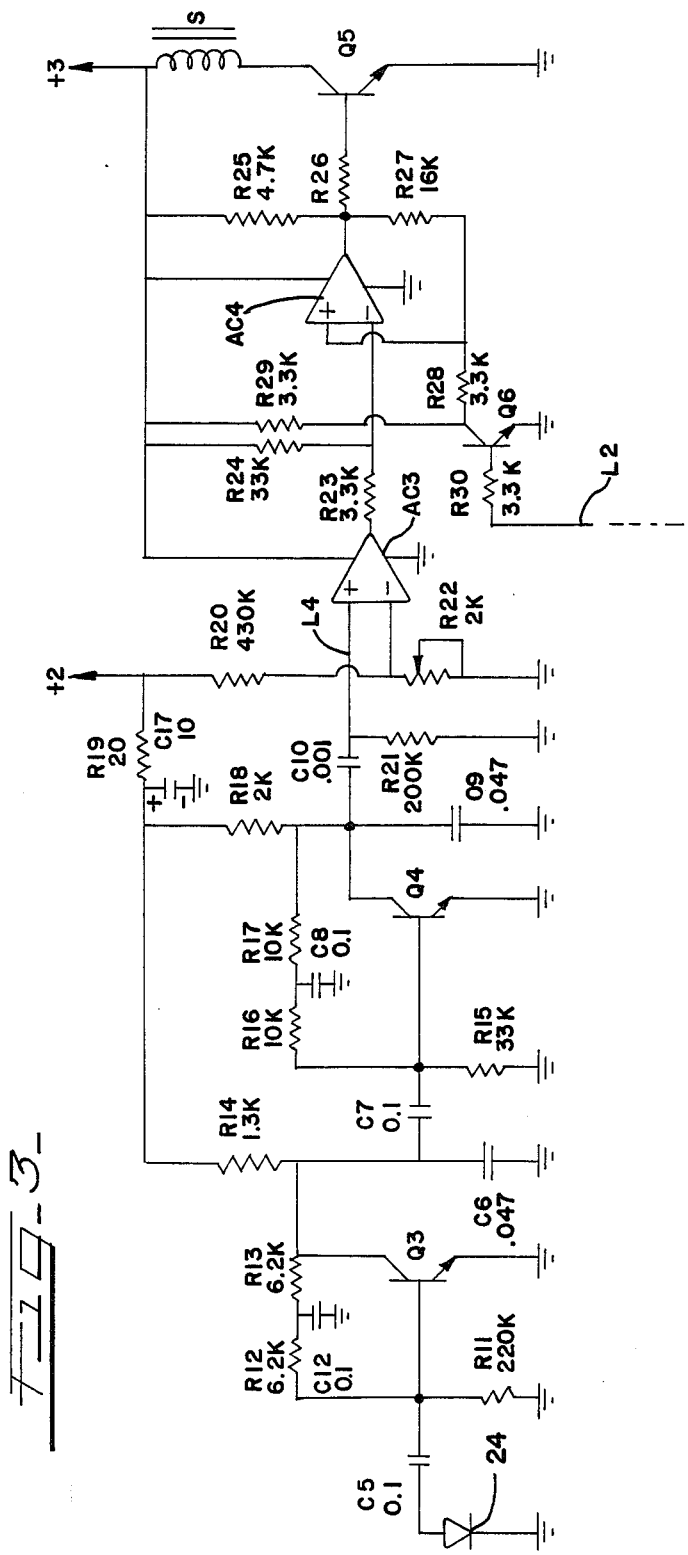
FIG. 3 is a pulse detection circuit for converting a received light pulse to a control signal used to control a camera setting.

FIG. 1 is a block schematic diagram showing in general form the principal aspects of the present invention as applied to adjusting an image-affecting parameter of a camera, i.e., the focus setting of the lens or the aperture setting, according to the distance to the object to be photographed. The camera aperture setting, is, as is well known, a range-dependent variable when the camera is operated in flash mode. In the description to follow concerning FIG. 1, discussion will be directed toward the provision of three or more parameter settings, whereas the subsequent discussion of the circuitry implementing the concepts of the present invention as shown in FIGS. 2 and 3 will be oriented towards a simpler two-position focusing system based upon similar principles.

Considering FIG. 1 in more detail, power is applied from a battery to a power supply 10. A lens cover slide 7 is coupled to a pair of switches 5, 6 which are actuated responsively to moving the slide to uncover the lens preparatory to using the camera. Closure of switch 5 brings the power supply to an active condition, immediately supplying regulated voltages of 2.0 and 0.5 volts, and an unregulated voltage of 3.0 volts to power the various elements of the system. Switch 6 is a momentary contact switch which momentarily closes after the closure of switch 5 and after the power supply output voltages have been established, thereafter breaking contact. During this interval 3.0 volts are momentarily supplied to control line L2, after which time this voltage reverts to zero. As will subsequently be discussed, the reversion of line L2 to a low state is used to stabilize various aspects of the circuit into a proper configuration for signal processing. Subsequent actuation of a manually operated shutter release button 3 again raises control line L2 to a high state to trigger a pulse unit 12 to provide a short pulse of current to a light-emitting diode 14.

Light from the infrared light-emitting diode 14 is focused into a relatively narrow beam 18 illuminating a central region of the scene of interest. Light 20 reflected from an object generally centrally located in the scene is received by lens 22 and focused on a light-sensing diode 24. The excitation received by diode 24 thus varies with the distance to the object from which the outgoing beam 18 is reflected. This excitation signal is processed by a detector unit 26 to provide on output line L4 a signal varying in amplitude with the magnitude of excitation received by the light-sensing diode 24. The remainder of the system is best understood with reference to U.S. Pat. No. 4,473,285 issued to Winter, wherein there is described a system generally similar to that shown in FIG. 1. A plurality of comparators 28, 30 (and more if desired) are provided, each comparator being of the latching type and having a different triggering threshold. The system shown in FIG. 1 is particularized to a three-range system.

Under extremely weak conditions, the signal on line L4 will be insufficient to trigger either of the comparators 28, 30. This corresponds to objects at very far distances, requiring for example, the maximum-range focus setting of the camera lens. If the object is at an intermediate distance, then latching comparator 30 will trigger, but latching comparator 28 will not. For extremely close objects, both of the comparators 28, 30 will be triggered. The respective comparator outputs are placed on lines L6 and L8 respectively.

As described in the Winter patent, an electromechanical adjustment system 41 includes a rotary contact 38 having, in this case, three contacting pads 32, 34, 36 is driven into scanning rotation by a motor 40 upon total depression of the shutter button 3. This motor is typically of the spring-driven variety, being energized and cocked during the film advance process. Full operation of the shutter release button 3 releases the rotor 38 to sequentially contact the pads 32, 34, 36 in the order shown. As the rotor 38 contacts each of the pads 32, 34, 36 serially, the voltage supplied thereto from the latching comparators 28, 30 is sensed by a controller 42. In the event that a close object has caused the amplitude on line L4 to be quite high, both comparators 28, 30 will be latched to a presence-sensing state, as a result of which the rotor 38, upon contacting pad 32 will immediately relay this condition to the controller 42, which in turn operates a solenoid brake or latch 44, which acts to freeze the rotation of the rotor 38 on pad 32. The photographic objective lens 41 is synchronously coupled to the rotation of rotor 38 via the rotation of the motor 40 to be driven thereby through a range of focus settings. Such a system is fully disclosed in the above-referenced Winter patent.

Thus, the solenoid brake 44 freezes the operation of the lens focusing system upon contacting the close-distance pad 32, establishing the focusing of the lens 41 for a close object. In the event that the object is at an intermediate range capable of triggering only comparator 30, then the rotor 38 will continue its rotation until encountering the presence-indicating signal present on pad 34, thus terminating the motion of the lens at 41 the intermediate-focusing position. Finally, if neither comparator has been triggered, indicating a very distant object, then rotation continues to the extreme possible travel of the rotor 38 (and hence the lens 41) to terminate on pad 36, which corresponds to a mechanical limit stop in the focusing system of the lens 41. The lens 41 is now set for farthest focus. Responsively to final total depression of the shutter release button 3, a shutter actuator 46 actuates the shutter through an exposure cycle. Alternatively, a similar synchronously driven rotor may be employed in conjunction with a lens aperture control system for flash mode operation, such a system also being described in the above-referenced Winter patent.

FIG. 2 shows the circuit which produces a single pulse of infrared light from the light-emitting diode 14 responsively to the voltage pulse received via line L2 from the shutter release switch 8. Considering the pulse unit of FIG. 2 in more detail, the purpose of this unit is to charge diode energizing capacitors C2, C3 to essentially the full regulated 2.0 volts, and thereafter to deliver this charge to the light-emitting diode 14 as a short pulse responsively to the triggering pulse on line L2. The light-emitting diode 14 in the present embodiment is the infrared type TLN115 made by Toshiba. This diode 14 is operated in a pulse mode wherein a current of one ampere, the recommended maximum pulse current, is supplied initially to the diode to provide a current pulse decaying to the diode threshold turn-on value in approximately 90 microseconds. This pulsed operation is to be compared with the recommended maximum continuous operating current 100 milliamperes for such a unit. Being of the gallium arsenide family, this diode 14 requires a minimum of 2.2 volts in the forward direction for light emission. The present design is oriented towards use of a battery of 3.0 volts regulated down to 2.0 volts to provide for uniform excitation to the light-emitting diode 14. As will next be discussed, proper energizing current for the light-emitting diode 14 is achieved by charging the two discharge capacitors C2, C3 in parallel from the regulated 2.0 volt supply and thereafter discharging them in series through the diode.

The foregoing is accomplished by holding transistors Q1 and Q2 open in charging mode, whereafter they are both turned on to connect the capacitors C2, C3 in series to discharge them through the diode 14. In more detail, with transistors Q1 and Q2 off, then capacitor C3 is charged through resistors R8 and R10 from the 2.0 volt supply, placing the negative terminal of this capacitor at ground. Capacitor C2 is charged at the positive terminal thereof through resistor R9 from the positive 2.0 volt supply, and has the negative terminal thereof grounded through resistor R7. Transistors Q1 and Q2 are of the low saturation voltage type. When transistors Q1 and Q2 are turned on the current into the diode 14 flows from capacitor C3 through transistor Q1, through capacitor C2, (now connected in series with capacitor C3), and through transistor Q2. Thus, although capacitor C2 and C3 were charged in parallel from the 2.0 volt supply in charge mode, in discharge mode they are effectively connected in series with the diode 14.

Simultaneous triggering of transistors Q1 and Q2 is achieved by simultaneous operation of the amplitude comparators AC1 and AC2. Each comparator has its noninverting input terminal connected to regulated 0.5 volts, and the inverting input terminal connected to the battery voltage pulse provided on line L2 and attenuated to approximately 1.0 volts or thereabouts by the attenuating pair R1, R2.

Before the arrival of the trigger pulse, the 0.5 volt reference level applied to the noninverting input of the comparators AC1 and AC2 acts to produce an open circuit at the output thereof. These comparators AC1 and AC2 are of the open-collector type, their output stage collectors being essentially grounded when a positive signal greater than the 0.5 volt reference is applied to their inverting inputs. This will occur whenever the voltage pulse arriving on the line L2 is greater than approximately 1.0 volts. Until such a pulse arrives, transistors Q1 and Q2 are open, resistors R5 and R6 effectively pull their bases to the same potential as their emitters. It is during this period that capacitors C2 and C3 are charged in parallel. Upon arrival of a trigger pulse on line L2 greater than approximately 1.0 volts, the output collectors of comparators AC1, AC2 are grounded, energizing transistors Q1 and Q2 by emitter base bias applied respectively through resistors R3 and R4. Subsequent release of the high state of line L2 then restores transistors Q1 and Q2 to an open condition, allowing the charging process to begin again. Capacitor C1 is connected across resistor R2 for noise suppression purposes, and to suppress the effects of contact bounce during closure of switch 4. The resulting light output pulse from diode 14 is focused by lens 16 (FIG. 1) to form a narrow interrogation cone of light of semiapex angle of the order of 4 degrees, a region generally well confined to the central portion of the ordinary 35 mm format when used in conjunction with a lens of focal length.

FIG. 3 shows the circuit elements corresponding to the detector unit 26, latching comparator 28, and solenoid brake 44 of FIG. 1. As previously discussed, the present disclosure is oriented towards control of the focusing distance of a two-position lens positioned initially preferably at the hyperfocal position of the objective lens at its maximum aperture, the lens being thereafter released to be driven towards a short-focus position. This is most economically achieved in the present invention by configuring a solenoid brake (not shown) which normally prevents such motion from the far-focus position so long as solenoid S is energized. De-energizing this solenoid S releases this latching condition and allows the lens to be driven towards and arrested at the short-focus position. This occurs when transistor Q4 receives a high state at the base thereof indicative of strong light reception at diode 24.

In more detail, the photosensing diode 24 receives light from lens 22 (FIG. 1), the diode being type VTP3310L made by VACTEC Corporation of St. Louis, Mo. U.S.A. and having an effective sensing area of approximately 1.03 mm$^2$. The diode 24 and lens 22 are disposed so as to sense a central generally conical region of the viewing field of approximately 4 degrees apex semiangle, thereby receiving from a generally centrally located object in the field a return pulse of light. The optical system which excites diode 24 is preferably provided with an infrared-passing filter to screen out visible light insofar as is possible. This reduces the ambient excitation of diode 24 and provides for an increased range of photoresponse.

The diode 24 is operated in the current mode and generates a current directly proportional to the infrared light striking it. Capacitor coupling by capacitor C5 prevents the input of transistor Q3 from seeing the static type infrared signal that exists in some environments, e.g. bright daylight and strong fluorescent lighting. Such ambient signals can overload the amplifier because of its high gain, thereby desensitizing the system with respect to the pulse signals that are to be measured.

Coupling capacitor C5 and other capacitors are used to set the overall low frequency cutoff point for the amplifier. The amplifier, consisting of stages Q3 and Q4, is designed to have little sensitivity to signals below 1.5 kHz. This is important so that the amplifier can ignore the 120 Hz. infra-red flicker noise from 60 Hz. fluorescent lighting. Moreover, this low frequency cutoff combined with a high frequency cutoff of approximately 2.5 kHz. forms a band-pass response 1 kHz. wide, which improves the signal to noise ratio of the amplifier overall. Each of the two amplifier stages based upon transistors Q3 and Q4 has the same topology with slightly different component values to accommodate differences in operating point and impedance levels. Both stages use voltage mode feedback to stabilize the characteristics of the amplifier with respect to transistor variations. This form of feedback is chosen because the resulting amplifier then operates with the low power supply voltages that are present in the camera.

Considering the first stage based upon transistor Q3 in more detail, the pulse developed across the diode 24 is applied to the base of transistor Q3. The collector output voltage developed across pull-up resistor R14 is connected to the next stage through capacitor C7, capacitor C6 serving to roll off the high frequency response. A frequency-dependent feedback voltage is delivered from the collector of transistor Q3 to the base thereof through the series resistive network R13, R12, R11. Capacitor C12 is connected to the junctures of resistors R12 and R13, and serves to reduce the amount of inverse feedback above a given frequency, thereby setting the low frequency response of this particular stage.

The effect of this network is to make the a.c. load impedance presented to diode 24 to be about 2.8 kilohms. This renders the output of diode 24 to be generally linear with received light intensity thereby facilitating accurate range determination.

The stage based upon transistor Q4 is, as previously mentioned, configured in a substantially identical way, again inserting high and low frequency rolloff in the same manner. It will be noted in particular that a strong light pulse on diode 24 will result in positive drive (high) to the base of transistor Q3, which in turn results in a low drive condition to the base of transistor Q4, again resulting in a high condition at the collector thereof to be relayed to the inverting terminal of amplitude comparator AC3.

The output signal state of comparator AC3 governs whether or not solenoid S will be energized, and thus determines whether the lens is to be held immobile or moved to the near-focus position. The triggering threshold of comparator AC3 is set by the resistive divider R20, R22. Resistor R22 is a variable resistor, variation of this element setting the reference voltage derived from the 2.0 volt regulated supply to be provided to the inverting terminal of amplitude comparator AC3. In the absence of a strong light pulse sensing at diode 24, no signal will be applied to the noninverting terminal of comparator AC3, as a result of which the last-stage collector connected to the output terminal thereof will be grounded, resulting in a low state delivered to the negative terminal of the latching comparator circuit based on amplitude comparator AC4. A strong light signal, on the other hand, opens the output stage collector of comparator AC3, allowing the inverting input terminal of comparator AC4 to be pulled high.

Comparator AC4 is configured as a set-reset latch. It will be recalled that on power-up the momentary closure of switch 6 (FIG. 1) and the virtually immediate release thereof placed a high-low transition on line L2. This has the effect of resetting amplitude comparator AC4 to the low-light condition, i.e. the output collector is turned off, and will not be driven low (closed) until a high state, corresponding to a bright illumination signal condition is received at the noninverting input of comparator AC4. This is accomplished by placing transistor Q6 in an on condition when line L2 goes high, thereby effectively grounding the lower end of resistor R29, and latching the inverting input terminal of amplitude comparator AC4 in a high state by positive feedback derived from the voltage divider R27, R28. This condition is maintained after line L2 goes low, and the comparator AC4 is thus held in a reset condition until a positive (high) pulse is received from comparator AC3. It will also be noted that, since the shutter button 3 is released after every subsequent exposure, an automatic clearing reset operation is carried at comparator AC4 in preparation for the next exposure.

Thus, on initial power-up, comparator AC4 will be latched with its output collector open, placing a high state on the base of transistor Q5 through resistor R6, thus energizing the solenoid S to prevent movement of the objective lens from the far-focus position. If, however, a sufficiently bright flash is received by the diode 24, then a high state will appear at the noninverting input of comparator AC3, resulting in a high state at the inverting input of comparator AC4, causing closure of the output stage collector, effectively grounding the driven end of resistor R26, simultaneously removing drive to transistor Q25, and hence to the solenoid S. This allows the free movement of the objective lens to the near-focus position.

The system described hereinabove functions reliably in detecting objects as far as 15 feet from the objective lens, when used in conjunction with range finding lenses 16, 22 having an approximate focal length of 19 mm and diameter of 10 mm. The use of a single pulse system providing the range information by means of reflected amplitude only, and not requiring the use of relatively expensive triangulation detectors markedly reduces manufacture of the price of such units, and contributes materially to system simplicity.

It will also be recognized that the system described may equally well be reconfigured with additional amplitude comparators to provide, for example, an intermediate focus setting by using system S described with reference to FIG. 1.

Finally, it should be recognized that the principles of the present invention may readily be adapted to be incorporated into cameras having additional features not recited herein. Thus, for example, the power supply 10 (FIG. 1) may be of the time-out type which is brought into operation to remain active for a period of five minutes or so in response to momentary closure of switch S5.

For convenience, an additional pair of early-closure contacts may be associated with the push button switch 8 and connected in parallel so that a light tap on the pushbutton 3 will restore the power supply to an active condition. Additionally, provision may readily be made by means that will be apparent to those skilled in the art to incorporate a pre-focus feature by appropriate switching whereby the camera may be pointed at the object on which the camera is to be focused, the shutter button 3 partially depressed to trigger the ranging circuitry to set the latching comparator AC4, the camera thus pointed to place the focused object off center with respect to the scene to be photographed, after which time further depression of the shutter button the shutter motor 40 and shutter actuator 46.

I claim:

1. In a battery powered camera range sensing system having power terminals adapted for connection to a battery, a light-emitting diode disposed to emit light in a desired range of wavelengths onto objects in the scene to be photographed, pulsing means for energizing said light-emitting diode once responsively to each initial actuation of a shutter release system, photosensing means responsive to scene illumination produced by pulsing said light-emitting diode for providing an object-distance-indicating electrical signal condition, and drive means for adjusting at least one range-dependent camera parameter according to said signal condition, said ranging system being provided with a system voltage derived from said terminals, said light-emitting diode requiring for its proper operation an energization voltage in excess of said system voltage the improvement wherein; said pulsing means includes a plurality of capacitors, a circuit for coupling said terminals to said capacitors, and means for charging said plurality of capacitors in parallel connection from said terminals and means for discharging said plurality of capacitors in series connection through said light-emitting diode until the voltage delivered to said light-emitting diode drops to said energization voltage.

2. The camera of claim 1 further including
first directing means for directing said light emitted from said light-emitting diode into a generally centrally located portion of said scene;
second directing means for directing light from said light-emitting diode and reflected from an object within said generally centrally located portion of said scene into said camera in the form of a localized spot;
said photosensing means including electrical photodetector means having a photosensing area of a desired size disposed to receive said spot upon said photosensing area for providing a photosensing signal having a amplitude corresponding to the amount of object-reflected light transmitted to said photodetector means by said second directing means in said desired range of wavelengths, and signal processing means responsive to the amplitude of said photosensing signal for coupling said object-distance-indicating signal condition to said drive means to adjust said parameter according to said amplitude, and thus according to the distance to said object.

3. The camera of claim 1 wherein said photodetector means is configured such that said amplitude is substantially invariant with the position of said spot within said photosensing area.

4. The camera of claim 1 wherein said second directing means is configured to direct said reflected light into a spot substantially smaller than said photosensing area.

5. The camera of claims 2, 3, 4, or 1 wherein said image-affecting parameter is the focus setting of the objective lens of said camera.

6. The camera of claims 2, 3, 4, or 1 wherein said pulsing means provides to said light-emitting diode a pulse of current in excess of twice the rated steady-state current of said light-emitting diode.

7. The camera of claims 2, 3, 4, or 1 wherein said signal processing means includes means for inhibiting the passage of electrical signal conditions indicative of constant illumination of said object.

8. The camera of claims 2, 3, 4, or 1 wherein said signal processing means includes electrical filter means for restricting the signal response thereof to a desired range of frequency components.

9. The camera of claims 2, 3, 4, or 1 wherein said camera includes means for restricting the radiation incident upon said photodetector means to a desired range of infrared wavelengths.

10. The camera of claims 2, 3, 4, or 1 wherein said photodetector means is a semiconductor diode.

11. The Camera of claims 2, 3, 4, or 1 wherein said photodetector means is a semiconductor diode operated in current mode.

12. The camera of claims 2, 3, 4, or 1 wherein said signal processing means includes means for adjusting said parameter to at least three different object-distance related settings.

13. The camera of claim 1 wherein said system voltage is provided at positive and negative system buses, said light-emitting diode has its cathode connected to said negative system bus, and said pulsing means includes a pair of said capacitors, a resistance charging network configured to charge said capacitors from said system buses in parallel connection thereto at a rate substantially less than the series discharge rate, a first semiconductor switching element connected between the positive terminal of one of said capacitors and the negative terminal of the other of said capacitors, a second semiconductor switching element connected between said negative terminal and the anode of said light-emitting diode, and triggering means for momentarily actuating said switching elements to the closed condition responsively to initial operation of said shutter release system.

14. The camera of claims 1 or 13 further including a voltage regulator circuit for supplying a regulated system voltage from said battery.

* * * * *